Aug. 30, 1966   G. E. HOENIG ETAL   3,269,498
TORQUE LIMITING CLUTCH
Filed Aug. 5, 1964   2 Sheets-Sheet 2
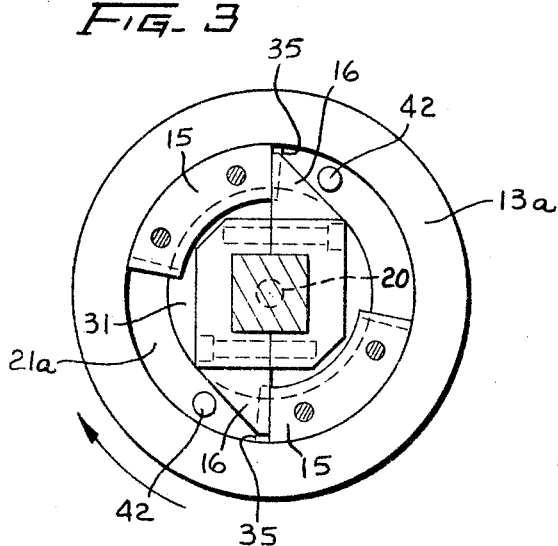
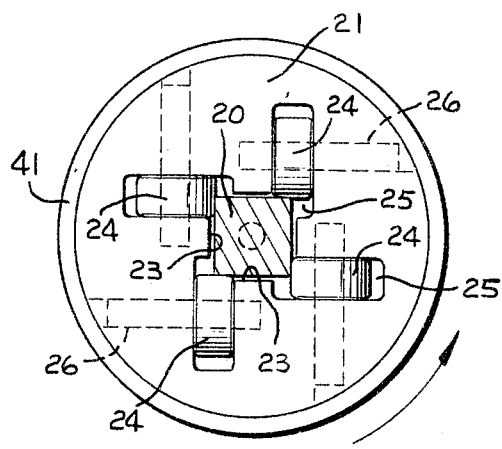
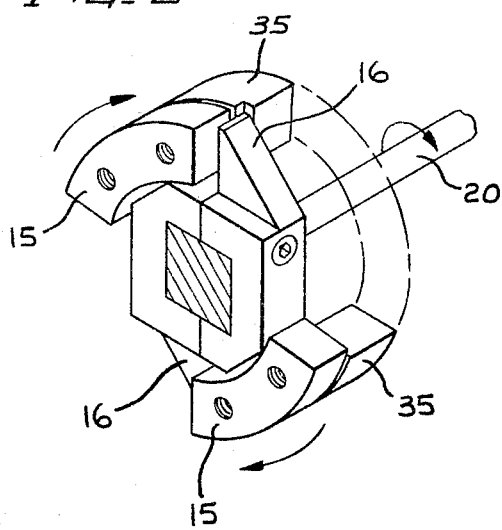
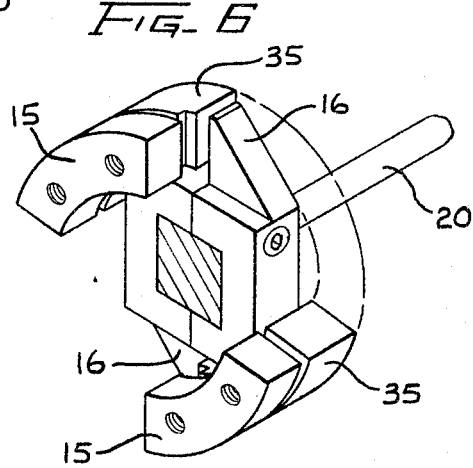

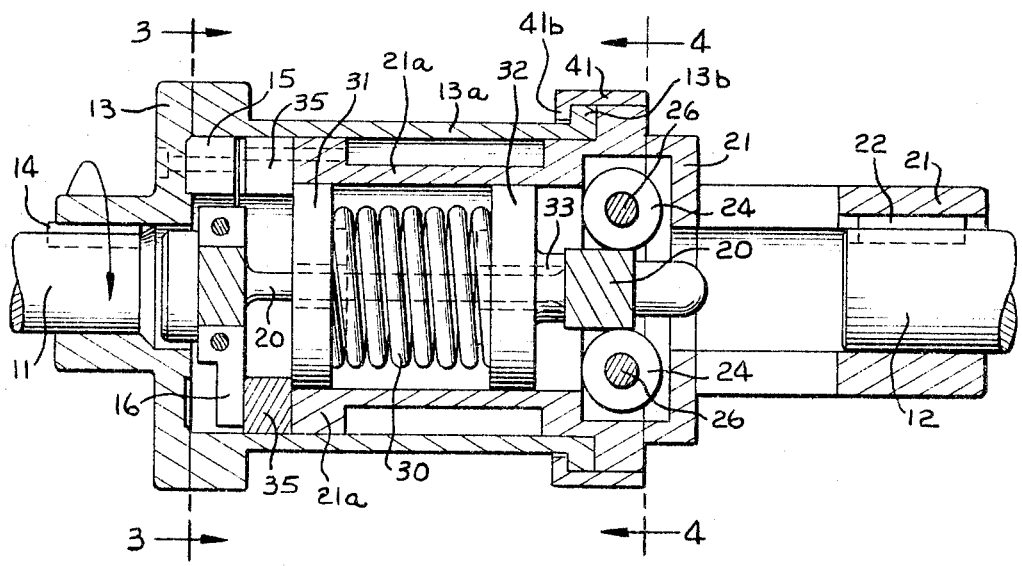
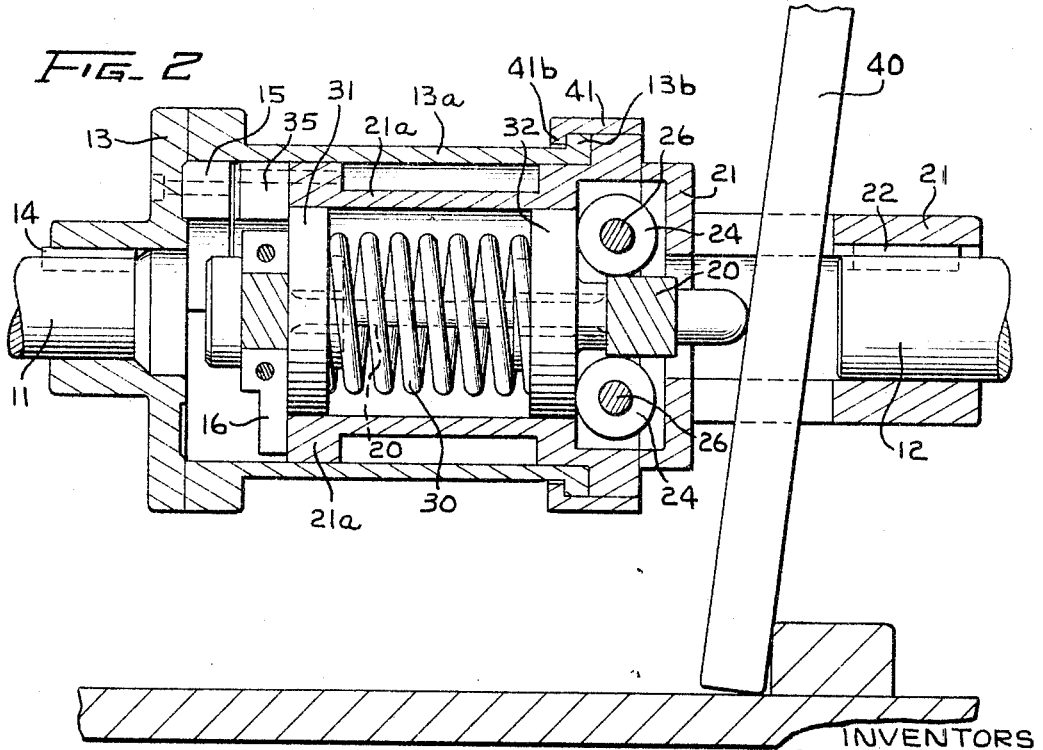

United States Patent Office 3,269,498
Patented August 30, 1966

3,269,498
TORQUE LIMITING CLUTCH
Gerhard E. Hoenig, Lawrence, and Arden L. Van Nest, Indianapolis, Ind., assignors to Western Electric Company, Incorporated, New York, N.Y., a corporation of New York
Filed Aug. 5, 1964, Ser. No. 387,584
8 Claims. (Cl. 192—56)

This invention relates to a torque limiting clutch, and more particularly to a clutch which disengages to interrupt drive when torque of a prescribed value is applied thereto. It is an object of the invention to provide an improved clutch of such character.

Previously known torque limiting clutches have various undesirable characteristics. A fault which is frequently present is that the limiting torque which is intended to cause tripping of the clutch is variable either because of varying degrees of frictional resistance which must be overcome before tripping can be effected, or because the resilient member which is responsive to the applied torque to effect tripping is erratic, particularly where the clutch is caused to trip a substantial number of times. Another commonly present fault of existing overload clutches is that they are subject to wear at critical points such that, again, tripping occurs with the applied torque differing from the intended limiting torque. Still another fault commonly found in overload clutches is that the clutch, and particularly, the resilient, torque responsive element thereof, is subject to breakage upon the sudden application of a torque which is substantially greater than the intended maximum torque.

It is another object of the invention to provide an improved torque limiting clutch in which the resilient, torque responsive member is a torsion bar of inherently rugged construction, such bar being capable of withstanding many applications of excessive torque without being subject to fatigue.

It is still another object of the invention to provide an improved torque limiting clutch of such construction that triggering elements which are displaced with respect to each other upon triggering of the clutch may be of very rugged construction such that accurate triggering can be obtained following a large number of operations.

It is a further object of the invention to provide an improved torque limiting clutch in which the torque which can be applied to the resilient, torque responsive member is positively limited.

Another object of the invention is to provide an improved torque limiting clutch in which frictional resistance to the tripping of the clutch is maintained at a low level.

A further object of the invention is to provide an improved torque limiting clutch which is readily reset after being tripped.

Still another object of the invention is to provide an improved torque limiting clutch having various of the characteristics specified above while being inherently rugged in construction, efficient and reliable in operation and inexpensive to manufacture and maintain.

In accordance with one embodiment of the invention rotary, axially aligned driving and driven member are releasably interconnected by a torsion bar which is axially positioned and axially aligned with the driving and driven members. The torsion bar is capable of longitudinal movement with respect to the driving and driven members and is spring urged toward a position in which the driving connection between the bar and one of the members is interrupted. One of the driving and driven members is arranged to restrain such disconnecting movement of the bar by the spring under normal conditions. However, when the torque applied to the torsion bar reaches a prescribed limiting value, the torsion bar becomes free of restraint and is advanced to its disconnected position by the spring.

This invention, together with further objects and advantages thereof, will best be understood by reference to the following description taken in connection with the accompanying drawings, in which FIG. 1 is a cross-sectional view of a torque limiting clutch illustrating a preferred embodiment of the invention, the clutch being in torque transmitting condition;

FIG. 2 is a view similar to FIG. 1 but illustrating the clutch in its disconnected condition;

FIG. 3 is a cross-sectional view taken along line 3—3 of FIG. 1;

FIG. 4 is a cross-sectional view taken along the line 4—4 of FIG. 1;

FIG. 5 is a perspective view of the left-hand portion of the clutch, as viewed in FIG. 1, with the clutch in torque transmitting condition; and FIG. 6 is a view similar to FIG. 5 but illustrating the clutch in its disconnected condition.

The torque limiting clutch is illustrated in FIGS. 1 and 2 in conjunction with a drive shaft 11 and a driven shaft 12. A driving member 13 is secured to the drive shaft 11 by a key 14, and carries a pair of arcuate members 15, best seen in FIGS. 5 and 6.

Two dogs 16 are secured to one end of a torsion bar 20, the torsion bar having a squared end in order that it be non-rotatable with respect to the dog assembly. Normally, that is when the clutch is actuated, the dogs 16 are in alignment with and contact shoulder areas of the arcuate members 15 such that rotation of the driving member 13 and the arcuate members 15 causes rotation of the dogs 16 and the torsion bar 20.

A driven member 21 is secured to the driven shaft 12 by a key 22, and has a square opening 23, best seen in FIG. 4, for receiving the right-hand end of the torsion bar 20, this end of the torsion bar also having a square cross section in order that it be non-rotatable with respect to the driven member 21.

As may be seen in FIGS. 1, 2 and 4, the driven member 21 is provided with rollers 24 which are received in slots 25 in the driven member 21 and mounted on pins 26. The rollers 24 engage appropriate edges of the squared right-hand end of the torsion bar 20 such that they bear the forces attendant with the transmission of torque from the torsion bar 20 to the driven member 21. The rollers are provided in order that longitudinal movement of the torsion bar with respect to the driven member 21 (described below) may be accomplished with a minimum of friction even though a substantial torque is being transmitted from the torsion bar to the driven member.

It may now be seen that torque is normally transmitted from the drive shaft 11 to the driven shaft 12 through the key 14, the driving member 13, arcuate members 15, dogs 16, torsion bar 20, rollers 24, driven member 21 and key 22. It is, of course, desired that this drive connection be interrupted when the torque being transmitted exceeds a specified maximum value. In accordance with the present invention the drive is interrupted when the torque applied to the torsion bar 20 causes twisting of the torsion bar through an angle of a prescribed number of degrees.

A coil spring 30 is provided for urging the torsion bar to the right in FIGS. 1 and 2 such that the dogs 16 break contact with the arcuate members 15. The driven member 21 includes a tubular extension 21a. Arranged within the left-hand end of the tubular extension 21a is a ring 31 having a central opening such that it may freely encircle the torsion bar. The ring 31 is split in order that it may be assembled over the torsion bar, and is firmly secured to the tubular extension 21a.

A similar split ring 32 freely encircles the torsion bar at the right of the spring 30 and is freely slidable within the tubular extension 21a. This ring has a hub 33 which bears against the right-hand squared end of the torsion bar. It may now be seen that the coil spring 30, which is in compression between the two rings 31 and 32, urges the torsion bar 20 to the right with respect to the driven member 21.

Restraining members 35 are secured to the left-hand end of the tubular extension 21. As is best seen in FIG. 5, the restraining members 35, under normal conditions, extend a short distance circumferentially beyond the dog-engaging faces of the arcuate members 15. Under normal conditions, therefore, the restraining members 35 restrain the dogs 16, and hence the torsion bar 20, from advancing to the right in FIGS. 1 and 2 under the influence of the spring 30.

When the clutch is called upon to transmit a torque in excess of a prescribed maximum torque, the resulting twisting of the torsion bar 20 displaces the dogs 16 circumferentially with respect to the restraining members 35 such that they are free to move to the right in FIGS. 1 and 2 under the influence of the spring 30. This moves the dogs 16 out of the path of the arcuate members 15 and the drive is interrupted.

It should be noted in this respect that since the restraining members 35 are mounted on the driven member 21 they are circumferentially oriented in a fixed relationship with respect to the right-hand end of the torsion bar 20. As opposed to this, the dogs 16 have a fixed circumferential orientation with respect to the left-hand end of the torsion bar. Accordingly, twisting of the torsion bar by the application of a torque in excess of the prescribed value results in circumferential displacement of the dogs 16 with respect to the restraining members 35 such that the dogs and the torsion bar are free to be moved to the right by the spring 30. The flexibility of the torsion bar 20 and the extent to which the restraining members 35 extend circumferentially beyond the effective faces of the dogs 16 when the torsion bar is relaxed determine the value of the torque which will cause interruption of the drive.

Upon application of the excess torque to the clutch, the clutch is caused to change from its actuated condition shown in FIGS. 1 and 5 to its released position illustrated in FIGS. 2 and 6. Reference to FIGS. 1 and 2 reveals that rightward movement of the torsion bar under the influence of the spring 30 is limited by engagement of the dogs 16 with the split ring 31. The squared right-hand end of the torsion bar 20 is of sufficient length that it remains at all times in driving engagement with the rollers 24. This retains the torsion bar at all times in proper angular orientation with respect to the driven member 21 such that resetting of the clutch does not require that the operator first orient these parts.

Resetting of the clutch, therefore, can then be accomplished merely by the application of a suitable force to the right-hand end of the torsion bar. One convenient method is illustrated in FIG. 2 wherein a simple lever 40 is inserted through suitable slots in the driven member 21 such that it may be brought to bear against the right-hand end of the torsion bar.

Reference to FIG. 6 reveals that the axial dimension of the restraining members 35 is sufficient that the dogs 16 remain in contact with the restraining members when the dogs and the torsion bar move to the released position. The restraining members 35, therefore, serve to guide the dogs 16 back to their actuated positions during resetting of the clutch.

In the illustrated embodiment of the invention the driving member 13 includes a tubular extension 13a which extends to the main portion of the driven member 21. This extension serves to support the left-hand or free end of the tubular extension 21a of the driven member 21, which is freely rotatable within the tubular extension 13a. The tubular extension 13a is in turn supported by the main portion of the driven member 21 and by a sleeve 41 which is secured to the driven member 21. The right-hand or free end of the tubular extension 13a is, of course, freely rotatable with respect to the driven member 21 and the sleeve 41 after the clutch has been disengaged. Cooperating flanges 13b and 41b serve to hold the driving and driven members 13 and 21 from movement away from each other.

As can be seen only in FIG. 3, a pair of pins 42 are secured to the restraining members 35. In the event that there is a sudden application of excessive torque to the clutch, the dogs 16 can be circumferentially displaced with respect to the restraining members 35 and the driven member 21 only to the extent that they strike the pins 42. Twisting of the torsion bar 20 is thus limited even though the applied torque reaches an excessive value before the spring 30 can withdraw the dogs from engagement with the arcuate members 15.

In the embodiment of the invention illustrated in the drawings and described above, the shaft 11 is designated the drive shaft and the shaft 12 is designated the driven shaft. It will be apparent to those skilled in the art that this situation may be reversed without alteration of the torque limiting clutch.

It will be noted that in the illustrated embodiment of the invention the dogs 16 serve dual functions (1) they transmit torque from the arcuate members 15 to the left-hand end of the torsion bar 20, and (2) they cooperate with the restraining members 35 to hold the torsion bar 20 in its actuated position. It will be apparent to those skilled in the art that these two functions may be served by different elements. More specifically, the dogs 16 might be employed to cooperate with the arcuate members 15 to transmit torque to the torsion bar, and other elements might be provided protruding radially from the torsion bar to cooperate with the restraining members 35.

Attention is directed to the fact that the effective length of the torsion bar is the distance from the area of engagement of the torsion bar 20 with the driven element 21 (in the illustrated embodiment of the invention) to the cooperating faces of the dogs 16 and the restraining members 35. If the torsion bar were extended substantially to the left beyond this point, twisting of the portion of the torsion bar to the left of this point would have no effect on the tripping of the clutch. The cooperating faces of the dogs and the restraining members, therefore, comprise one effective end of the torsion bar.

It will now be apparent to those skilled in the art that the illustrated embodiment of the invention incorporates a resilient, torque responsive member, namely the torsion bar 20, which is of inherently rugged construction capable of withstanding many applications of excess torque without being subject to fatigue. The construction of the clutch is such that the triggering elements, namely the dogs 16 and the restraining members 35, may be of extremely simple and rugged construction such that accurate triggering can be obtained following a large number of operations. The illustrated embodiment of the invention also provides for limitation of the torque which is applicable to the torsion bar even upon sudden application of excessive torque. Still further, it will be apparent that with the use of rollers at the right-hand end of the torsion bar, the only significant friction to be overcome in the tripping of the clutch is that between the dogs 16 and the restraining members 35 and between the dogs and the arcuate members 15. The engaging surfaces are of substantial area such that friction may be maintained at a relatively low and constant value.

While various embodiments of the invention have been disclosed, many modifications will be apparent, and it is intended that the invention be interpreted as including all modifications which fall within the true spirit and scope of the invention.

What is claimed is:
1. A torque-limiting clutch comprising:
a rotatable driving member;
a rotatable driven member axially aligned with said driving member;
a torsion bar axially positioned and axially aligned with respect to said driving and driven members and drivingly engageable at one end with one of said members and at its other end with the other of said members, said torsion bar being longitudinally movable with respect to said members to disengage from at least one of said members;
means tending to resiliently urge said bar longitudinally out of engagement with said one member;
said bar having an element protruding radially therefrom near one end of said bar;
the member which is drivingly engageable with the other end of said bar having a restraining portion which is normally axially aligned and engaged with said element to maintain driving engagement of said bar with said one member, said element and said restraining portion being relatively angularly movable out of axial alignment by twisting of said bar such that said urging means may disengage said bar from said one member upon the application of a predetermined torque to said bar.

2. A torque-limiting clutch as specified in claim 1, wherein said bar is disengageable from only one of said members.

3. A torque-limiting clutch as specified in claim 1, wherein said restraining portion extends a sufficient distance in the direction of movement of said bar such that said element engages said restraining portion when said bar is in released position, and such that such restraining portion serves to guide said element during resetting of the clutch.

4. A torque-limiting clutch comprising:
a rotatable driving member;
a rotatable driven member axially aligned with said driving member;
a torsion bar axially positioned and axially aligned with respect to said driving and driven members and longitudinally movable with respect to said members;
dog means on one end of said bar, and shoulder means on one of said members, positively drivingly engaged when said bar is in an actuated position, and disengaged when said bar is displaced longitudinally to a released position; and means tending to resiliently urge said bar longitudinally from its actuated position toward its released position;
the other of said members being positively drivingly engaged with the other end of said bar at least when said bar is in actuated position and having a restraining portion which is normally axially aligned and engaged with said dog means to maintain driving engagement of said dog means with said shoulder means, said dog means and said restraining portion being relatively angularly movable out of axial alignment by twisting of said bar such that said urging means may disengage said dog means from said shoulder means upon the application of a predetermined torque to said bar.

5. A torque-limiting clutch as specified in claim 4, wherein said bar and said other member are drivingly engaged at all times.

6. A torque-limiting clutch as specified in claim 4, wherein said restraining portion extends a sufficient distance in the direction of movement of said bar such that said dog means engage said restraining portion when said bar is in released position, and such that said restraining portion serves to guide said element during resetting of the clutch.

7. A torque-limiting clutch as specified in claim 4, wherein said other end of said bar is generally rectangular in cross section, and wherein roller means are provided on said other member in engagement with said other end of said bar, the rectangular cross section of said bar being of such length that driving engagement of said bar and said other member through said roller means is maintained at all times.

8. A torque-limiting clutch as specified in claim 4, wherein the member which is drivingly engageable with said other end of said bar has another portion extending into circumferential alignment with said dog means and circumferentially spaced therefrom such that twisting of said torsion bar is positively limited thereby.

References Cited by the Examiner

UNITED STATES PATENTS

| 2,546,633 | 3/1951 | Dadge | 192—56 X |
| 2,684,738 | 7/1954 | Kaplan | 192—30.5 |
| 2,948,373 | 8/1960 | Schild | 192—56 |

DAVID J. WILLIAMOWSKY, *Primary Examiner.*

A. McKEON, *Assistant Examiner.*